US010657237B2

(12) United States Patent
Alameh et al.

(10) Patent No.: US 10,657,237 B2
(45) Date of Patent: May 19, 2020

(54) METHODS AND SYSTEMS FOR ELECTRONIC DEVICE CONCEALED MONITORING

(71) Applicant: Motorola Mobility LLC, Chicago, IL (US)

(72) Inventors: Rachid Alameh, Crystal Lake, IL (US); Thomas Merrell, Beach Park, IL (US); Jarrett Simerson, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 206 days.

(21) Appl. No.: 15/898,565

(22) Filed: Feb. 17, 2018

(65) Prior Publication Data

US 2019/0258785 A1   Aug. 22, 2019

(51) Int. Cl.
*G06F 21/32* (2013.01)
*G06F 1/3231* (2019.01)
*G06F 21/50* (2013.01)

(52) U.S. Cl.
CPC ............ *G06F 21/32* (2013.01); *G06F 1/3231* (2013.01); *G06F 21/50* (2013.01)

(58) Field of Classification Search
CPC ......... G06F 21/32; G06F 21/50; G06F 1/3231
USPC .......................................................... 726/2
See application file for complete search history.

(56) References Cited

U.S. PATENT DOCUMENTS

| | | | | |
|---|---|---|---|---|
| 2004/0177265 A1* | 9/2004 | Ice, Jr. | ................... | G06F 21/31 713/2 |
| 2008/0127355 A1* | 5/2008 | Lorch | ................ | H04N 21/4435 726/29 |
| 2009/0045983 A1* | 2/2009 | Miller | ...................... | G08G 3/00 340/984 |
| 2010/0197290 A1* | 8/2010 | Luzzatto | .............. | H04B 1/3838 455/418 |
| 2013/0091564 A1* | 4/2013 | Fitzgerald | ............... | G06F 21/88 726/17 |
| 2017/0264614 A1* | 9/2017 | Huang | ................ | H04L 63/0428 |
| 2018/0096174 A1* | 4/2018 | Finger | ..................... | H04W 4/50 |
| 2019/0245877 A1* | 8/2019 | Toth | ...................... | H04L 63/083 |

\* cited by examiner

*Primary Examiner* — Michael S McNally
(74) *Attorney, Agent, or Firm* — Philip H. Burrus, IV

(57) ABSTRACT

An electronic device includes one or more sensors, a user interface having one or more user interface output devices, and one or more processors operable with the one or more sensors and the user interface. The one or more processors receive, from the user interface, a command to power OFF the electronic device. Upon failing to detect, with the one or more sensors, an authorized user of the electronic device as a source of the command to power OFF the electronic device, the one or more processors disable the one or more user interface output devices while leaving the one or more sensors operational.

20 Claims, 9 Drawing Sheets

METHODS AND SYSTEMS FOR ELECTRONIC DEVICE CONCEALED MONITORING

BACKGROUND

Technical Field

This disclosure relates generally to electronic devices, and more particularly to electronic devices having sensors.

Background Art

Mobile communication devices are becoming increasingly powerful. Today's smartphone packs more computing power than the desktop computers of only a few years ago. All of this computing power brings increased functionality. Accordingly, users use electronic communication for all types of activities. In addition to voice, text, and multimedia communication, users employ devices such as smartphones to execute financial transactions, record, analyze, and store medical information, store pictorial records of their lives, maintain calendar, to-do, and contact lists, and even perform personal assistant functions.

Where an electronic device contains so much personal information, it can be quite disconcerting to lose the device or have it stolen. An improved electronic device to facilitate recovery in such situations would be advantageous.

Figure 1:
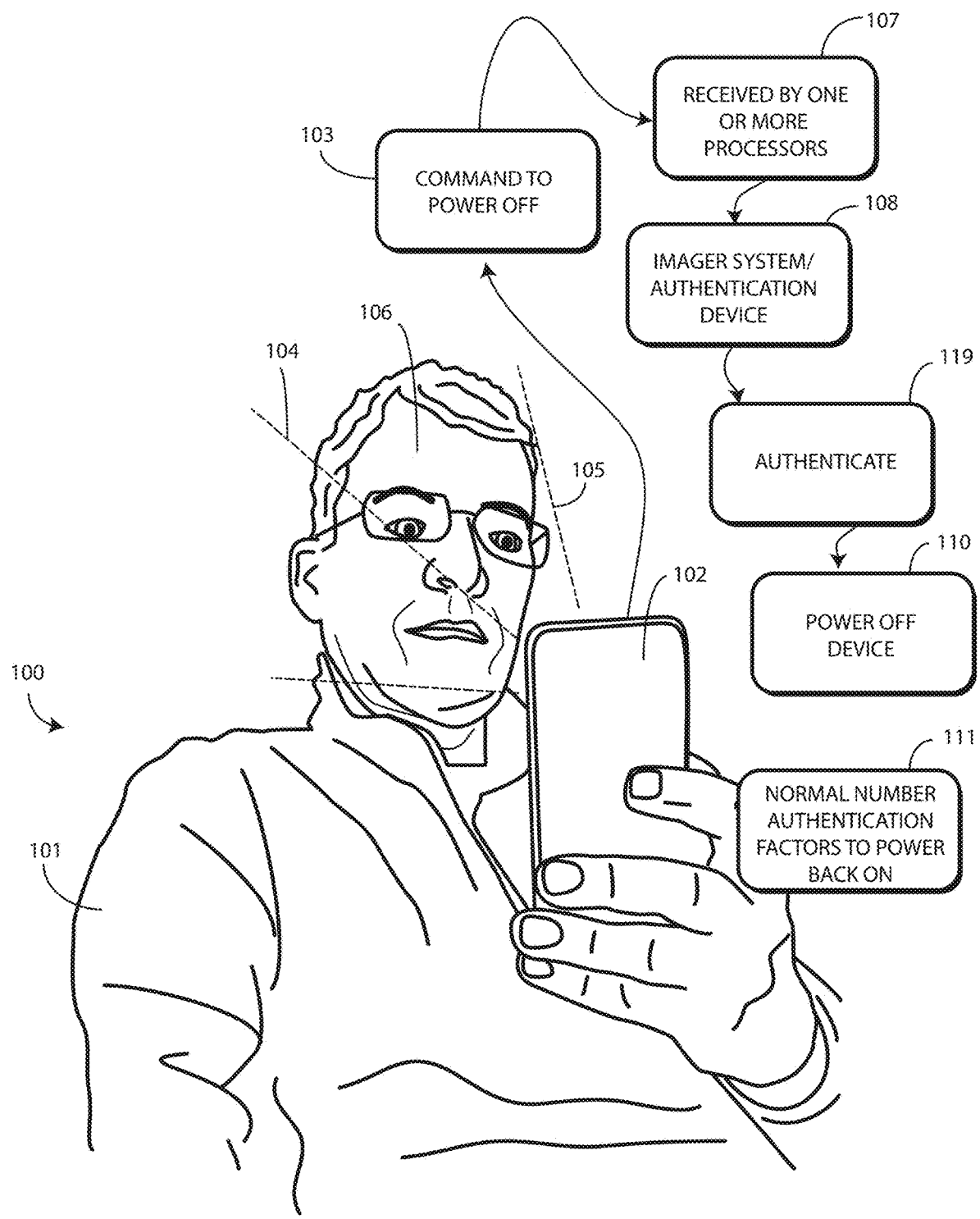
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to surreptitiously monitoring one or more inputs from an environment of an electronic device while emulating a powered OFF state of the electronic device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and monitoring an environment, in a concealed manner, while emulating an OFF state, so that electronic devices can be retrieved when misappropriated by an unauthorized user to overcome problems specifically arising in the realm of the technology associated with modern electronic device user authentication techniques.

It will be appreciated that embodiments of the disclosure described herein may be comprised of one or more conventional processors and unique stored program instructions that control the one or more processors to implement, in conjunction with certain non-processor circuits, some, most, or all of the functions of monitoring, with one or more input devices, one or more inputs from an environment of an electronic device while disabling user interface output devices described herein. The non-processor circuits may include, but are not limited to, a radio receiver, a radio transmitter, signal drivers, clock circuits, power source circuits, and user input devices. As such, these functions may be interpreted as steps of a method to perform disabling user interface output devices to emulate a powered OFF state while keeping one or more input devices of the electronic device operational for covert monitoring of the environment.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that when a portable electronic device, such as a smartphone or tablet computer, is stolen, the person in possession of that electronic device will frequently turn the device completely OFF to prevent location tracking, inbound or outbound voice or data communications, and sensor operation. Alternatively, embodiments of the disclosure contemplate that the person in possession of that electronic device may attempt to reset the device back to its original factory setting, thereby erasing any stored user data. Advantageously, embodiments of the disclosure are operable to identify, with one or more sensors of an electronic device, and unauthorized user providing a command to power OFF the electronic device at a user interface of the electronic device. When this occurs, one or more processors of the electronic device can disable user output devices of the electronic device so as to emulate a powered OFF state. At the same time, the one or more processors can surreptitiously keep one or more input devices, such as an audio input device, an imager, a geo-locator, and/or a wireless communication circuit operational to monitor inputs from an environment of the electronic device. Advantageously, while appearing to be powered OFF and fully shut down, the one or more processors conduct silent input monitoring to see, hear, and detect information about the electronic device. The owner of the device can use this information to more efficiently recover the electronic device. Additionally, embodiments of the disclosure allow the owner to protect sensitive data in the electronic device while the device is in possession of an unauthorized user.

In one or more embodiments, the electronic device periodically monitors the user using the device. With one or more sensors and authentication devices, described in more detail below, the one or more processors of the electronic device can determine whether the user is an authorized user or an unauthorized user. If the user is an authorized user, and that authorized user attempts to power OFF the electronic device, the one or more processors completely power OFF and shut down the electronic device in response to the user's command.

However, where there is an unauthorized user, and that unauthorized user attempts to power OFF the electronic device, in response to the command to power OFF the electronic device, the one or more processors emulate a powered OFF state by disabling user output devices such as visual output devices, audio output devices, haptic output devices, or combinations thereof. Accordingly, the electronic device appears to be shutting down.

In one or more embodiments, at the same time the one or more processors keep one or more input devices operational. Accordingly, these input devices monitor environmental conditions, including sounds, sights, location, and/or other information. The one or more processors monitor this information quietly in the background while the device appears to be powered OFF. The fact that information is being monitored is invisible to the user possessing the phone in this state in one or more embodiments. As the user interface output devices are OFF, all indications that anything is operational on the electronic device are turned OFF. Examples of these user interface output devices include light emitting devices, indicators, ringers, audio output devices, the display, infrared output devices, haptic or tactile output devices, vibrational output devices, alerts, and so forth.

In one or more embodiments, the final determination of whether the person delivering the command to turn OFF the electronic device is an authorized or unauthorized user occurs at the time the command is received. In another embodiment, a determination of whether the person who is operating the device just prior to shut down is an authorized or unauthorized user. In one or more embodiments, an image or facial scan of the person is captured during shutdown, with the same being seamlessly triggered by the delivery of the power OFF command. In some embodiments, an image or facial scan occurs as the person delivering the power OFF command looks at the electronic device while delivering the command. In other embodiments, the one or more processors may even ask the person delivering the command to authenticate or confirm their identity. For example, the one or more processors may present a prompt on the display requesting that the person place their finger on a fingerprint sensor, enter a code, look at an imager, or so forth.

Once this occurs, the one or more processors emulate the powered OFF state by disabling the user interface output devices. However, at the same time, the one or more processors use the active and operational input devices to sense, hear, see, communicate, and even upload sensed data to a remote electronic device or the cloud. However, to the user holding the device, the electronic device appears completely OFF.

Thus, in one or more embodiments when an unauthorized user—or for that matter just someone who is not positively identified as the authorized user—delivers a command to power OFF an electronic device, the one or more processors continue secretly monitoring inputs from the environment of the electronic device in the background. In one or more embodiments, unless receipt of a command to power OFF the electronic device is detected as being from an authorized user, a default mode of operation is to assume an unauthorized user delivered the command to power OFF the electronic device. Accordingly, the one or more inputs secretly monitor, and optionally inform the owner of this mode by other communication (such as email). In one or more embodiments, those one or more processors can upload by transmitting, across a network, data representations of the one or more inputs to a remote electronic device such as another wireless communication device or a cloud-computing device.

As will be described below, when the electronic device enters this emulated powered OFF state, in one or more embodiments the one or more processors can increase a number of authorized user identification factors required to cease emulating the powered OFF state and return to the fully powered ON state. Illustrating by example, if a facial scan is all that is typically required to turn the electronic device ON, the one or more processors may require a facial scan, fingerprint, and personal identification number (PIN) code before ceasing emulation of the powered OFF state and return to the fully powered ON state. Alternatively, the one or more processors may cease the powered OFF state and return to the fully powered ON state if the authorized user delivers a facial scan while at an identified owner location, such as in front of his vehicle license plate or in his living room. Other examples of elevating the number of authorized identification factors will be obvious to those of ordinary skill in the art having the benefit of this disclosure.

In one or more embodiments, the one or more processors can notify other electronic devices of its location. The one or more processors can further transmit ambient environmental information such as acoustic information, weather information (wind, rain), traffic information, images of people, motion information, and so forth to these other electronic devices. The one or more processors can, for instance, continually or periodically capture images of the immediate environment about the electronic device for transmission to these remote devices.

In one or more embodiments, this captured information can first be stored internally within the electronic device in a region of memory that can only be erased by the operating system. Where this occurs, even if there is a "factory reset" of the electronic device, this data will be protected. In other embodiments, the ability to factory reset the electronic device will be disabled when emulating the powered OFF state. Similarly, private applications of files identified by the user as personal can be hidden when emulating the powered OFF state.

In still another embodiment, the one or more processors can periodically wake to perform the environmental monitoring with operational user input devices. This works to conserve battery capacity. When operational, the one or more processors can gather information, attempt to identify the authorized user, deliver data representations of the one or more environmental inputs received to a remote electronic device, and so forth, even when initially powered OFF by an authorized user. In this mode, the one or more processors can detect whether an unauthorized user has somehow taken control of the electronic device while powered OFF. Moreover, this operational state could continue so long as there was sufficient battery capacity. Embodiments of the disclosure contemplate that an authorized user can lose their electronic device when it is in a powered OFF state. This mode of operation advantageously allows the one or more processors to determine if an unauthorized user has taken control of the electronic device, and optionally, to notify the authorized user and/or have the authorized user communicate with the electronic device via the cloud.

Advantageously, embodiments of the disclosure provide, in an electronic device, dual shutdown functional modes driven by the one or more processors based upon authorized user identification. In one or more embodiments, the one or more processors are operable to identify user at the moment of shut down or just prior to shut down (the identity at shut down is weighed more heavily than just prior in one or more embodiments). Prior identification could be considered for confirmation if at shut down identity is not clearly captured.

In one or more embodiments, the one or more processors are operable to disable user interface output devices while silently monitoring, with one or more input devices, an environment about the electronic device when an unauthorized user shuts device down. In one or more embodiments, the one or more processors can communicate, via a wireless communication device, data representations of detected environmental conditions, e.g., motion, location, sounds, lights, and other sensory data such as image captures, to the cloud or to another remote electronic device. In one or more embodiments, the authorized user can remotely trigger certain functionality within the electronic device, due to the fact that the one or more processors are covertly operational. For example, in one or more embodiments the authorized user can remotely delete data, save data, upload data, capture data, change settings, erase settings, and so forth. As noted above, in one or more embodiments when a shutdown operation is unauthorized, the one or more processors can elevate device security levels by adding factors such as multi-factor authentication, authentication in the right location context, and so forth.

In one or more embodiments, an electronic device comprises one or more sensors. In one or more embodiments, the electronic device comprises a user interface comprising one or more user interface output devices. In one or more embodiments, the electronic device comprises one or more processors operable with the one or more sensors and the user interface.

In one or more embodiments, the one or more processors receive, from the user interface, a command to power OFF the electronic device. In one or more embodiments, upon failing to detect with the one or more sensors, an authorized user of the electronic device as a source of the command to power OFF the electronic device, the one or more processors disable the one or more user interface output devices while leaving the one or more sensors operational. This allows the electronic device to emulate a powered OFF state while monitoring conditions, images, sounds, locations, and/or other information within an environment of the electronic device.

Turning now to FIG. 1, illustrated therein is illustrated therein is one explanatory system 100 configured in accordance with one or more embodiments of the disclosure. As shown, a user 101 is holding an electronic device 102. The user 101 is delivering a command 103 to power OFF the electronic device 102. The command 103 to power OFF the electronic device 102 is received 107 by one or more processors of the electronic device 102. In one or more embodiments, the command 103 to power OFF the electronic device 102 is received 107 by one or more processors of the electronic device 102 from a user interface of the electronic device 102.

In one or more embodiments, when this occurs, the electronic device 102 attempts to authenticate the user 101 as an authorized user of the electronic device 102 in accordance with one or more embodiments of the disclosure. As will be described in more detail with reference to FIG. 4 below, authentication can occur in a variety of ways. These ways can include by delivery of a fingerprint image to a fingerprint sensor, by entry of a PIN code, by voice recognition, by iris scan, or by other techniques. In this illustrative embodiment, the user 101 is delivering a facial recognition input to an authentication system 108 to authenticate himself as an authorized user of the electronic device 102. The facial recognition input can comprise two-dimensional imaging, depth scan imaging, thermal sensing, optionally one or more higher authentication factors, or combinations thereof.

In this illustrative embodiment, the authentication system 108 comprises an imager (described below with reference to FIG. 2). The imager captures at least one image 105 of an object situated within a predefined radius of the electronic device 102, which in this case is the user 101. In one embodiment, the imager captures a single image 105 of the object. In another embodiment, the imager captures a plurality of images of the object. In one or more embodiments, the one or more images are each a two-dimensional image. For example, in one embodiment the image 105 is a two-dimensional RGB image. In another embodiment, the image 105 is a two-dimensional infrared image. Other types of two-dimensional images will be obvious to those of ordinary skill in the art having the benefit of this disclosure.

In one or more embodiments, the image 105 can be compared to one or more predefined reference images stored in memory of the electronic device 102. By making such a comparison, one or more processors disposed within the electronic device can confirm whether the shape, skin tone, eye color, hair color, hair length, and other features identifiable in a two-dimensional image are that of the authorized user identified by the one or more predefined reference images.

In one or more embodiments, authentication system 108 can further include a depth imager (also described below with reference to FIG. 2). In one or more embodiments the depth imager captures at least one depth scan 104 of the object when situated within the predefined radius of the electronic device 102. In one embodiment, the depth imager captures a single depth scan 104 of the object. In another embodiment, the depth imager captures a plurality of depth scans of the object.

Figure 3:
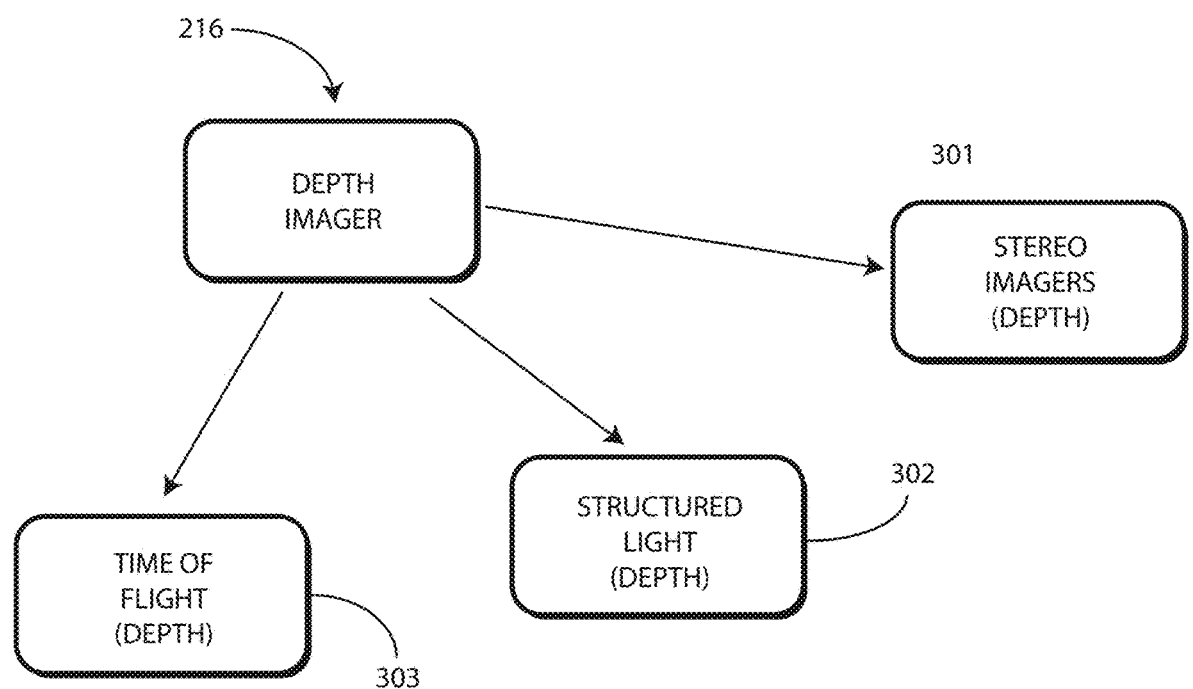
FIG. 3 illustrates one or more explanatory authentication systems in accordance with one or more embodiments of the disclosure.

As will be described below in more detail with reference to FIG. 3, the depth imager can take any of a number of forms. These include the use of stereo imagers, separated by a predefined distance, to create a perception of depth, the use of structured light lasers to scan patterns—visible or not—that expand with distance or project different patterns, and that can be captured and measured to determine depth or projecting different patterns, time of flight sensors that determine how long it takes for an infrared or laser pulse to translate from the electronic device 102 to the user 101 and back. Other types of depth imagers will be obvious to those of ordinary skill in the art having the benefit of this disclosure. However, in each case, the depth scan 104 creates a depth map of a three-dimensional object, such as the user's face 106. This depth map can then be compared to one or more predefined facial maps stored in memory to confirm whether the contours, nooks, crannies, curvatures, and features of the user's face 106 are that of the authorized user identified by the one or more predefined facial maps.

In one or more embodiments, the image 105 and the depth scan 104 are used in combination for authentication purposes. This results in the number of authorized user identification factors 111 required for authentication 109 being two. In one or more embodiments one or more processors compare the image 105 with the one or more predefined reference images. The one or more processors then compare the depth scan 104 with the one or more predefined facial maps.

Authentication 109 will fail in one or more embodiments unless the image 105 sufficiently corresponds to at least one of the one or more predefined images and the depth scan 104 sufficiently corresponds to at least one of the one or more predefined facial maps. As used herein, "sufficiently" means within a predefined threshold. For example, if one of the predefined images includes five hundred reference features, such as facial shape, nose shape, eye color, background image, hair color, skin color, and so forth, the image 105 will sufficiently correspond to at least one of the one or more predefined images when a certain number of features in the image 105 are also present in the predefined images. This number can be set to correspond to the level of security desired. Some users may want ninety percent of the reference features to match, while other users will be content if only eighty percent of the reference features match, and so forth.

As with the predefined images, the depth scan 104 will sufficiently match the one or more predefined facial maps when a predefined threshold of reference features in one of the facial maps is met. In contrast to two-dimensional features found in the one or more predefined images, the one or more predefined facial maps will include three-dimensional reference features, such as facial shape, nose shape, eyebrow height, lip thickness, ear size, hair length, and so forth. As before, the depth scan 104 will sufficiently correspond to at least one of the one or more predefined facial maps when a certain number of features in the depth scan 104 are also present in the predefined facial maps. This number can be set to correspond to the level of security desired. Some users may want ninety-five percent of the reference features to match, while other users will be content if only eighty-five percent of the reference features match, and so forth.

The use of both the image 105 and the depth scan 104 as combined authentication factors (i.e., the use of two authorized user identification factors 111) is far superior to using one or the other alone (i.e., the use of one authorized user identification factor 111). The depth scan 104 adds a third "z-dimension" to the x-dimension and y-dimension data found in the image 105, thereby enhancing the security of using the user's face 106 as their password in the process of authentication by facial recognition. Another benefit of using the depth scan 104 in conjunction with the image 105 is the prevention of someone "faking" the imager acting alone by taking an image 105 of a picture of the user 101, rather than the user 101 themselves. Illustrating by example, if only the imager is used, a nefarious person trying to get unauthorized access to the electronic device 102 may simply snap a picture of a two-dimensional photograph of the user 101. The use of a depth scan 104 in conjunction with the image 105 prevents this type of chicanery by requiring that a three-dimensional object, i.e., the actual user 101, be present and within the predefined radius before the authentication system authenticates the user 101.

The opposite is also true. Use of only the depth imager, without the imager, can be similarly problematic. If only the depth imager is used, a nefarious actor attempting to gain unauthorized access to the electronic device 102 may create a three-dimensional, lifelike mask of the user 101. However, the use of the image 105 in conjunction with the depth scan 104 prevents this, as features of the user 101 that are hard to replicate with a mask are verified from the image 105, which is a RGB image in one or more embodiments. Features such as facial shape, nose shape, eye color, hair color, skin color, and so forth can be sufficiently verified by comparing the image 105 to the one or more predefined reference images. Advantageously, the use of the image in conjunction with the depth scan 104 prevents this type of chicanery by capturing a color two-dimensional image of the object, thereby confirming that the object looks like the user 101 in addition to being shaped like the user 101.

In one or more embodiments, authentication 109 occurs where each of the following is true: the at least one image 105 sufficiently corresponds to at least one of the one or more predefined images and the at least one depth scan 104 sufficiently corresponds to at least one of the one or more predefined facial maps. Where both are true, in one or more embodiments, the object is authenticated 108 as the user 101 authorized to use the electronic device 102.

In one or more embodiments, when the authentication 109 fails, for whatever reason, the one or more processors can lock or limit full access the electronic device 102 to preclude access to it or the information stored therein. For example, if the at least one image 105 fails to sufficiently correspond to at least one of the one or more predefined images the one or more processors can lock the electronic device 102 to preclude access to it or reduce access or the information stored therein. Similarly, if the at least one depth scan 104 fails to correspond to at least one of the one or more predefined facial maps, the one or more processors can lock the electronic device 102 to preclude access to it or the information stored therein. When the electronic device 102 is locked, the one or more processors may then require additional authorized user identification factors 111 beyond the image 105 or the depth scan 104 to authenticate the user 101 at the next authentication cycle.

However, in other embodiments, as will be described below with reference to FIG. 5, when the authentication 109 fails, for whatever reason, the one or more processors can disable user interface output devices of the electronic device 102 while keeping one or more input devices of the electronic device 102 operational. Examples of user interface output devices include one or more of visual output devices, audio output devices, haptic output devices, or combinations thereof. Still other examples of user interface output devices will be obvious to those of ordinary skill in the art having the benefit of this disclosure. Examples of input devices include one or more of an imager, a microphone, a geo-locator, a wireless communication circuit, a motion detector, or combinations thereof. This action allows the electronic device 102 to emulate a powered OFF state while still monitoring an environment of the electronic device 102 with the operational input devices. In one or more embodiments, this disablement of the user interface output devices comprises disabling comprises disabling all user interface output devices of the electronic device.

In this case, however, the user 101 is authenticated 109 as the authorized user of the electronic device 102. Accordingly, the one or more processors of the electronic device 102 power OFF 110 the electronic device 102 normally in response to the receipt 107 of the command 103 to power OFF the electronic device 102.

Figure 2:
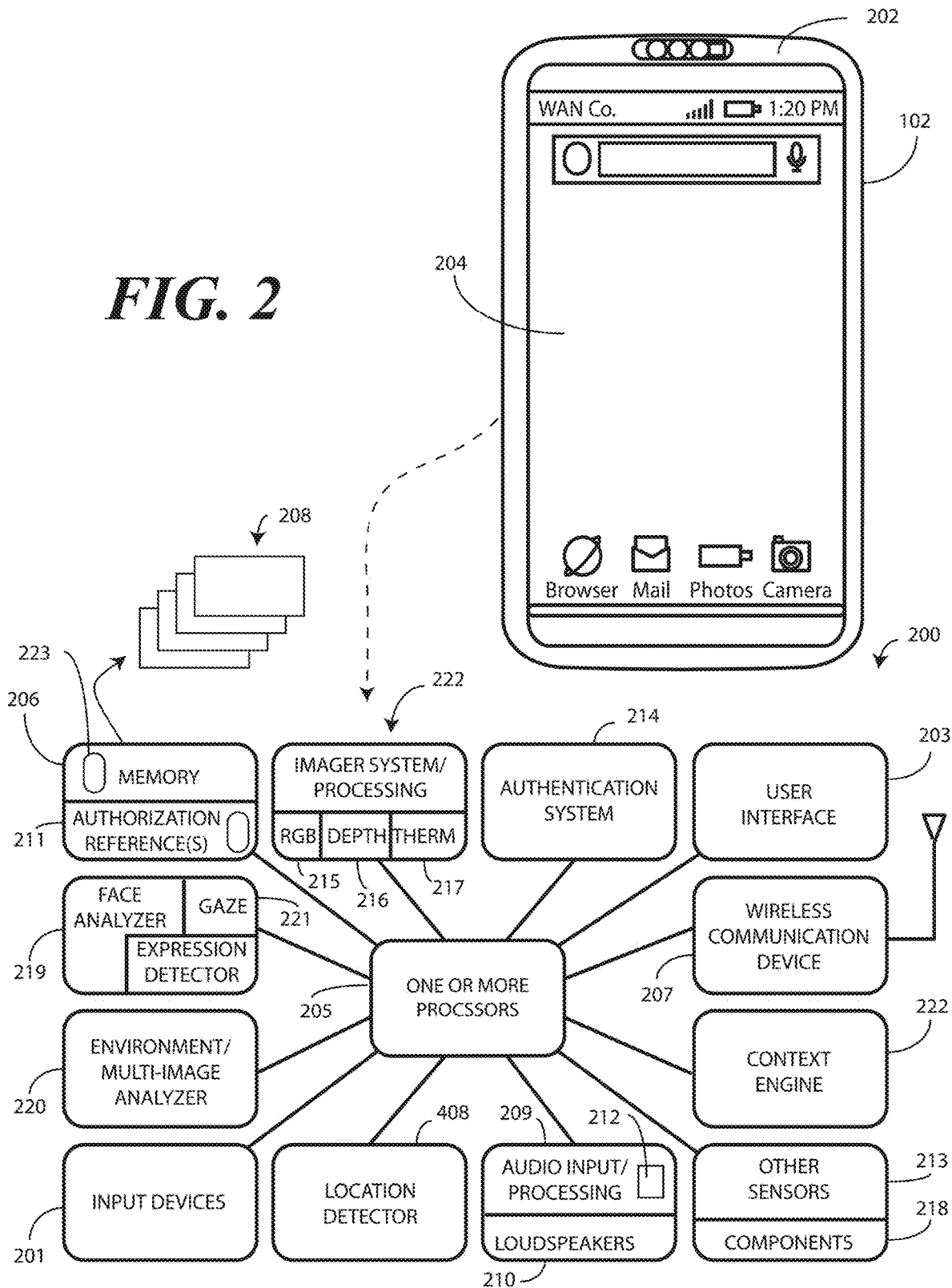
FIG. 2 illustrates one explanatory electronic device in accordance with one or more embodiments of the disclosure.

Turning now to FIG. 2, illustrated therein is one explanatory electronic device 102 configured in accordance with one or more embodiments of the disclosure. In this illustrative embodiment, the electronic device 102 includes several different input devices 201.

Figure 4:
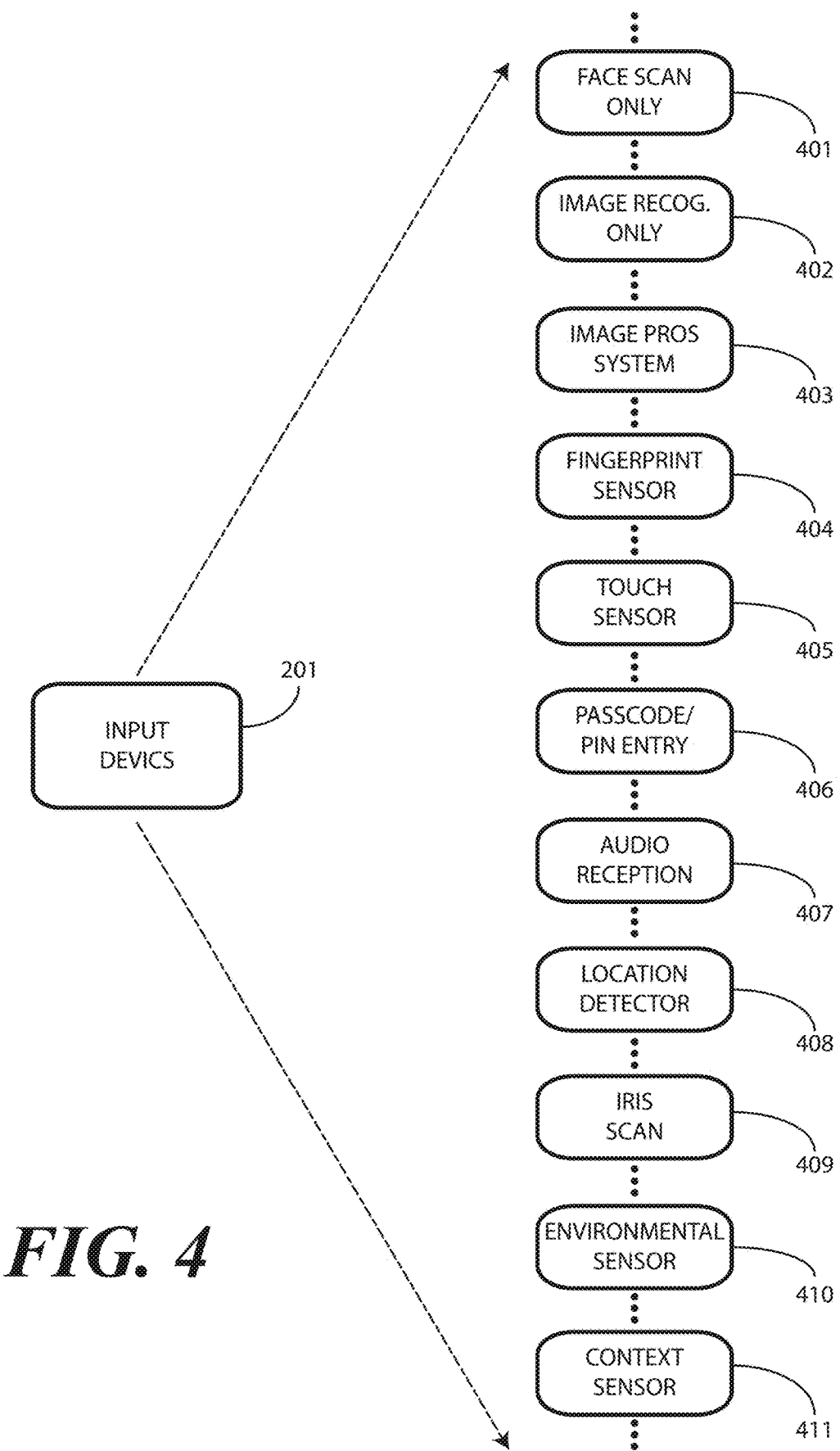
FIG. 4 illustrates one or more authentication factors suitable for authenticating a user, alone or in combination, in an electronic device configured in accordance with one or more embodiments of the disclosure.

Turning briefly to FIG. 4, illustrated therein are various examples of input devices 201 that can be included with the electronic device (102) in accordance with one or more embodiments of the disclosure. The input devices 201 can be used in alone or in combination. Moreover, the input devices 201 are illustrative only, and are not intended to provide a comprehensive list of input devices 201. Numerous other input devices 201 will be obvious to those of ordinary skill in the art having the benefit of this disclosure.

A first input device 401 can comprise a facial scanner. The first input device 401 can capture at least one depth scan an object when situated within the predefined radius of an electronic device (102). In one embodiment, facial scanner captures a single depth scan of the object. In another embodiment, the facial scanner captures a plurality of depth scans of the object.

The facial scanner can take any of a number of forms. These include the use of stereo imagers, separated by a predefined distance, to create a perception of depth, the use of structured light lasers to scan patterns—visible or not—that expand with distance and that can be captured and measured to determine depth or projecting different patterns, time of flight sensors that determine how long it takes for an infrared or laser pulse to translate from an electronic device to a user and back. Other types of facial scanners will be obvious to those of ordinary skill in the art having the benefit of this disclosure. However, in each case, the facial scanner creates a depth map of a three-dimensional object, such as a person's face. This depth map can then be compared to one or more predefined authentication reference files to confirm whether the contours, nooks, crannies, curvatures, and features of the person's face are that of an authorized user identified by the one or more predefined authentication references, which may include one or more predefined facial maps.

A second input device 402 comprises an imager. The imager can capture at least one image of an object situated within a predefined radius of an electronic device (102). In one embodiment, the imager captures a single image of the object. In another embodiment, the imager captures a plurality of images of the object. In one or more embodiments, the one or more images are each a two-dimensional image. For example, in one embodiment the image is a two-dimensional RGB image. In another embodiment, the image is a two-dimensional infrared image. Other types of two-dimensional images will be obvious to those of ordinary skill in the art having the benefit of this disclosure.

A third input device 403 can comprise a combined image processing system. The combined image processing system can use images and depth scans in combination. The third input device 403 can also include a thermal sensor to detect an amount of thermal energy received from an object within a thermal reception radius of an electronic device (102). In one or more embodiments, the input device 403 can be directional so as to ensure that any received thermal energy is spatially aligned with a particular object.

A fourth input device 404 can be a fingerprint sensor. The fingerprint sensor can capture a fingerprint image when a finger is placed near or against the fingerprint sensor. As used herein, a fingerprint image refers to a digital image and/or any other type of data representing the print pattern features that distinctly identify a fingerprint of a finger. The fourth input device 404 can also include a presence sensor that periodically detects a presence of a warm object near the fingerprint sensor. In implementations, a fingerprint sensor can also be implemented to detect user presence, rather than implementing a separate presence sensor.

A fifth input device 405 can comprise a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry to detect an object in close proximity with—or touching—the surface of an electronic device (102) by establishing electric field lines between pairs of capacitive sensors and then detecting perturbations of those field lines. The electric field lines can be established in accordance with a periodic waveform, such as a square wave, sine wave, triangle wave, or other periodic waveform that is emitted by one sensor and detected by another.

A sixth input device 606 can comprise a PIN code receiver. The PIN code receiver can receive a PIN code or a pass code from a user.

A seventh input device 607 can comprise an audio input device, such as one or more microphones. The seventh input device 607 can comprise voice recognition engine where the identification of voices within the audio input received by the one or more microphones is desired. The voice recognition engine can comprise executable code, hardware, and various voice print templates (also referred to as "voice models"). The voice recognition engine can use the voice print templates to compare a voiceprint from received input. In operation, the voice recognition engine obtains voice data using at least one microphone. The voice recognition engine can extract voice recognition features from the voice data and generate a voiceprint. The voice recognition engine can compare the voiceprint to at least one predefined authentication reference, which may comprise a predefined voice print template.

An eighth input device 408 can comprise a location detector. The location detector can comprise a geo-locator. The location detector is able to determine location data of an electronic device (102) by capturing the location data from a constellation of one or more earth orbiting satellites, or from a network of terrestrial base stations to determine an approximate location.

A ninth input device 409 can comprise an iris scanner. The iris scanner can capture images and/or thermal or infrared scans of a person's iris. The iris scanner can employ either or both of visible and near-infrared light. The iris scanner can capture high-contrast images of a person's iris.

A tenth input device 410 can comprise an environmental sensor. The environmental sensor can sense or determine physical parameters indicative of conditions in an environment about an electronic device (102). Such conditions include weather determinations, noise determinations, lighting determinations, and so forth. Such conditions can also include barometric pressure, moisture levels, and temperature of an electronic device (102).

An eleventh input device 411 can comprise a context sensor. In contrast to the environmental sensor of the tenth input device 410, the context sensor of the eleventh input device 411 can infer context from data of the electronic device (102). Illustrating by example, the context sensor can use data captured in images to infer contextual cues. An emotional detector may be operable to analyze data from a captured image to determine an emotional state of persons within an environment of the electronic device (102). The emotional detector may identify facial gestures such as a smile or raised eyebrow to infer a person's silently communicated emotional state, e.g. joy, anger, frustration, and so forth. The context sensor may analyze other data to infer context, including calendar events, user profiles, device operating states, energy storage within a battery, application data, data from third parties such as web services and social media servers, alarms, time of day, behaviors a user repeats, and other factors. Other context sensors will be obvious to those of ordinary skill in the art having the benefit of this disclosure. The context sensor can be configured as either hardware components, or alternatively as combinations of hardware components and software components. The context sensor can be configured to collect and analyze non-physical parametric data.

Turning now back to FIG. 2, illustrated therein is one explanatory block diagram schematic 200 of one explanatory electronic device 102 configured in accordance with one or more embodiments of the disclosure. While a smartphone has been used to this point as an illustrative electronic device 102, it should be noted that the electronic device 102 could be other types of devices as well. In other embodiments, the electronic device 102 can be a conventional desktop computer, palm-top computer, tablet computer, gaming device, media player, wearable device, or other device. Still other devices will be obvious to those of ordinary skill in the art having the benefit of this disclosure.

In one or more embodiments, the block diagram schematic 200 is configured as a printed circuit board assembly disposed within a housing 202 of the electronic device 102. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 203. In one or more embodiments, the user interface 203 includes a display 204, which may optionally be touch-sensitive. In one embodiment, users can deliver user input to the display 204 of such an embodiment by delivering touch input from a finger, stylus, or other objects disposed proximately with the display 204. In one embodiment, the display 204 is configured as an active matrix organic light emitting diode (AMOLED) display. However, it should be noted that other types of displays, including liquid crystal displays, suitable for use with the user interface 203 would be obvious to those of ordinary skill in the art having the benefit of this disclosure.

In one embodiment, the electronic device includes one or more processors 205. In one embodiment, the one or more processors 205 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates. A storage device, such as memory 206, can optionally store the executable software code used by the one or more processors 205 during operation.

In this illustrative embodiment, the block diagram schematic 200 also includes a communication circuit 207 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 207 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 207 can include wireless communication circuitry, one of a receiver, a transmitter, or transceiver, and one or more antennas.

In one embodiment, the one or more processors 205 can be responsible for performing the primary functions of the electronic device with which the block diagram schematic 200 is operational. For example, in one embodiment the one or more processors 205 comprise one or more circuits operable with the user interface 203 to present presentation information, such as prompts, images, or animations, to a user on the display 204. Alternatively, the one or more processors 205 comprise one or more circuits operable with the user interface 203 to deliver audio output through one or more loudspeakers 210. The executable software code used by the one or more processors 205 can be configured as one or more modules 208 that are operable with the one or more processors 205. Such modules 208 can store instructions, control algorithms, and so forth.

In one or more embodiments, the block diagram schematic 200 includes an audio input/processor 209 and optionally one or more loudspeakers 210. The audio input/processor 209 can include hardware, executable code, and speech monitor executable code in one embodiment. The audio input/processor 209 can be operable with one or more predefined authentication references 211 stored in memory 206. With reference to audio input, the predefined authentication references 211 can comprise representations of basic speech models, representations of trained speech models, or other representations of predefined audio sequences that are used by the audio input/processor 209 to receive and identify voice commands that are received with audio input captured by an audio capture device. In one embodiment, the audio input/processor 209 can include a voice recognition engine. Regardless of the specific implementation utilized in the various embodiments, the audio input/processor 209 can access various speech models stored with the predefined authentication references 211 to identify speech commands.

The audio input/processor 209 can include a beam steering engine comprising one or more microphones 212. In one or more embodiments, two or more microphones 212 can be included for selective beam steering by the beam steering engine. For example a first microphone can be located on a first side of the electronic device 102 for receiving audio input from a first direction. Similarly, a second microphone can be placed on a second side of the electronic device 102 for receiving audio input from a second direction.

The beam steering engine can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager can estimate a location of a person's face and deliver signals to the beam steering engine alerting it in which direction to steer the first microphone and the second microphone. Where multiple people are around the electronic device 102, this steering advantageously directs a beam reception cone to the authorized user, rather than to others who are not authorized to use the electronic device 102.

Alternatively, the beam steering engine processes and combines the signals from two or more microphones to perform beam steering. The one or more microphones 212 can be used for voice commands and for receiving ambient and other acoustic information from an environment about the electronic device 102. In response to control of the one or more microphones 212 by the beam steering engine, a user location direction can be determined. The beam steering engine can then select between the first microphone and the second microphone to beam steer audio reception toward the user. Alternatively, the audio input/processor 209 can employ a weighted combination of the microphones to beam steer audio reception toward the user.

Various input devices 201 can be operable with the one or more processors 205. FIG. 4 below illustrated several examples such input devices 201. It should be noted that those shown in FIGS. 2 and 4 are not comprehensive, as others will be obvious to those of ordinary skill in the art having the benefit of this disclosure. Additionally, it should be noted that the various sensors shown in FIGS. 2 and 4 could be used alone or in combination. Accordingly, many electronic devices will employ only subsets of the sensors shown in FIGS. 2 and 4, with the particular subset defined by device application.

A first example of a sensor that can be included with the various input devices 201 is a touch sensor (405). The touch sensor (405) can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 205, to detect an object in close proximity with—or touching—the surface of the display 204 or the housing 202 of the electronic device 102 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor is a geo-locator that serves as a location detector. In one embodiment, location detector is able to determine location data when attempting to authenticate a user. Location can be determined by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector autonomously or with assistance from terrestrial base stations, for example those associated with a cellular communication network or other ground based network, or as part of a Differential Global Positioning System (DGPS), as is well known by those having ordinary skill in the art. The location detector may also be able to determine location by locating or triangulating terrestrial base stations of a traditional cellular network, such as a CDMA network or GSM network, or from other local area networks, such as Wi-Fi networks.

The various input devices 201 an orientation detector that determines an orientation and/or movement of the electronic device 102 in three-dimensional space. Illustrating by example, the orientation detector can include an accelerometer, gyroscopes, or other device to detect device orientation and/or motion of the electronic device 102. Using an accelerometer as an example, an accelerometer can be included to detect motion of the electronic device. Additionally, the accelerometer can be used to sense some of the gestures of the user, such as one talking with their hands, running, or walking.

The orientation detector can determine the spatial orientation of an electronic device 102 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 102.

An authentication system 214 can be operable with the one or more processors 205. The authentication system 214 can be operable with any of the input devices 201 of FIG. 4, either alone or in combination. Other input devices can be included as well.

For example, the authentication system 214 can be operable with an imager 215, a depth imager 216, and a thermal sensor 217. In one embodiment, the imager 215 comprises a two-dimensional imager configured to receive at least one image of a person within an environment of the electronic device 102. In one embodiment, the imager 215 comprises a two-dimensional Red-Green-Blue (RGB) imager. In another embodiment, the imager 215 comprises an infrared imager. Other types of imagers suitable for use as the imager 215 of the authentication system will be obvious to those of ordinary skill in the art having the benefit of this disclosure.

The thermal sensor 217 can also take various forms. In one embodiment, the thermal sensor 217 is simply a proximity sensor component included with the other components 218. In another embodiment, the thermal sensor 217 comprises a simple thermopile. In another embodiment, the thermal sensor 217 comprises an infrared imager that captures the amount of thermal energy emitted by an object. Other types of thermal sensors 425 will be obvious to those of ordinary skill in the art having the benefit of this disclosure.

The depth imager 216 can take a variety of forms. Turning briefly to FIG. 3, illustrated therein are three different configurations of the depth imager 216.

In a first embodiment, the depth imager 301 comprises a pair of imagers separated by a predetermined distance, such as three to four images. This "stereo" imager works in the same way the human eyes do in that it captures images from two different angles and reconciles the two to determine distance.

In another embodiment, the depth imager 302 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 303 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 301,302,303 adds a third "z-dimension" to the x-dimension and y-dimension defining the two-dimensional image captured by the imager (215), thereby enhancing the security of using a person's face as their password in the process of authentication by facial recognition.

Turning back to FIG. 2, the authentication system 214 can be operable with a face analyzer 219 and an environmental analyzer 220. The face analyzer 219 and/or environmental analyzer 220 can be configured to process an image or depth scan of an object and determine whether the object matches predetermined criteria by comparing the image or depth scan to one or more predefined authentication references 211 stored in memory 206.

For example, the face analyzer 219 and/or environmental analyzer 220 can operate as an authentication module configured with optical and/or spatial recognition to identify objects using image recognition, character recognition, visual recognition, facial recognition, color recognition, shape recognition, and the like. Advantageously, the face analyzer 219 and/or environmental analyzer 220, operating in tandem with the authentication system 214, can be used as a facial recognition device to determine the identity of one or more persons detected about the electronic device 102.

In one embodiment when the authentication system 214 detects a person, one or both of the imager 215 and/or the depth imager 216 can capture a photograph and/or depth scan of that person. The authentication system 214 can then compare the image and/or depth scan to one or more predefined authentication references 211 stored in the memory 206. This comparison, in one or more embodiments, is used to confirm beyond a threshold authenticity probability that the person's face—both in the image and the depth scan—sufficiently matches one or more of the predefined authentication references 211 stored in the memory 206 to authenticate a person as an authorized user of the electronic device 102.

Beneficially, this optical recognition performed by the authentication system 214 operating in conjunction with the face analyzer 219 and/or environmental analyzer 220 allows access to the electronic device 102 only when one of the persons detected about the electronic device are sufficiently identified as an authorized user of the electronic device 102. Accordingly, in one or more embodiments the one or more processors 205, working with the authentication system 214 and the face analyzer 219 and/or environmental analyzer 220 can determine whether at least one image captured by the imager 215 matches a first predefined criterion, whether at least one facial depth scan captured by the depth imager 216 matches a second predefined criterion, and whether the thermal energy identified by the thermal sensor 217 matches a third predefined criterion, with the first criterion, second criterion, and third criterion being defined by the reference files and predefined temperature range. The first criterion may be a skin color, eye color, and hair color, while the second criterion is a predefined facial shape, ear size, and nose size. The third criterion may be a temperature range of between 95 and 101 degrees Fahrenheit. In one or more embodiments, the one or more processors 205 authenticate a person as an authorized user of the electronic device 102 when the at least one image matches the first predefined criterion, the at least one facial depth scan matches the second predefined criterion, and the thermal energy matches the third predefined criterion.

In one or more embodiments, a user can "train" the electronic device 102 by storing predefined authentication references 211 in the memory 206 of the electronic device 102. Illustrating by example, a user may take a series of pictures. They can include identifiers of special features such as eye color, sink color, air color, weight, and height. They can include the user standing in front of a particular wall, which is identifiable by the environmental analyzer from images captured by the imager 215. They can include the user raising a hand, touching hair, or looking in one direction, such as in a profile view. These can then be stored as predefined authentication references 211 in the memory 206 of the electronic device 102.

A gaze detector 221 can be operable with the authentication system 214 operating in conjunction with the face analyzer 219. The gaze detector 221 can comprise sensors for detecting the user's gaze point. The gaze detector 221 can optionally include sensors for detecting the alignment of a user's head in three-dimensional space. Electronic signals can then be processed for computing the direction of user's gaze in three-dimensional space. The gaze detector 221 can further be configured to detect a gaze cone corresponding to the detected gaze direction, which is a field of view within which the user may easily see without diverting their eyes or head from the detected gaze direction. The gaze detector 221 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 221 of FIG. 2.

The face analyzer 219 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 215 or the depth imager 216 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 218 operable with the one or more processors 205 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 218 can also include proximity sensors. The proximity sensors fall in to one of two camps: active proximity sensors and "passive" proximity sensors, each of which constitutes an input device. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 202 of the electronic device 102. In one embodiment, the signal receiver is an infrared signal receiver to receive an infrared emission from an object such as a human being when the human is proximately located with the electronic device 102. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 205 can cause each proximity sensor component to operate at a first "effective" sensitivity so as to receive infrared emissions from a first distance. Similarly, the one or more processors 205 can cause each proximity sensor component to operate at a second sensitivity, which is less than the first sensitivity, so as to receive infrared emissions from a second distance, which is less than the first distance. The sensitivity change can be effected by causing the one or more processors 205 to interpret readings from the proximity sensor component differently.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 218 can optionally include a barometer operable to sense changes in air pressure due to elevation changes or differing pressures of the electronic device 102. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 218 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 102. Similarly, a temperature sensor can be configured to monitor temperature about an electronic device.

A context engine 222 can then operable with the various sensors and input devices to detect, infer, capture, and otherwise determine persons and actions that are occurring in an environment about the electronic device 102. For example, where included one embodiment of the context engine 222 determines assessed contexts and frameworks using adjustable algorithms of context assessment employing information, data, and events. These assessments may be learned through repetitive data analysis. Alternatively, a user may employ the user interface 203 to enter various parameters, constructs, rules, and/or paradigms that instruct or otherwise guide the context engine 222 in detecting multi-modal social cues, emotional states, moods, and other contextual information. The context engine 222 can comprise an artificial neural network or other similar technology in one or more embodiments.

In one or more embodiments, the context engine 222 is operable with the one or more processors 205. In some embodiments, the one or more processors 205 can control the context engine 222. In other embodiments, the context engine 222 can operate independently, delivering information gleaned from detecting multi-modal social cues, emotional states, moods, and other contextual information to the one or more processors 205. The context engine 222 can receive data from the various sensors. In one or more embodiments, the one or more processors 205 are configured to perform the operations of the context engine 222.

In one or more embodiments, the one or more processors 205 can be operable with the various authenticators of the authentication system 214. For example, the one or more processors 205 can be operable with a first authenticator and a second authenticator. Where more authenticators are included in the authentication system 214, such as those shown in FIGS. 2 and 3 above, the one or more processors 205 can be operable with these authenticators as well.

Thus, as shown in FIG. 2, in one or more embodiments the electronic device 102 comprises one or more sensors 213 and a user interface 203 comprising one or more user interface output devices. Examples of the user interface output devices include the one or more loudspeakers 210, the display 204, and some other components 218. The electronic device 102 also includes one or more processors 205 operable with the one or more sensors 2013 and the user interface 203.

In one or more embodiments, when the one or more processors 205 receive, from the user interface 203, a command to power OFF the electronic device 102, the one or more sensors 213 and/or the authentication system 214 attempts to identify whether an authorized user is delivering the command to power OFF the electronic device 102. In one or more embodiments, upon failing to detect, with the one or more sensors 213 and/or the authentication system 214, an authorized user of the electronic device 102 as a source of the command to power OFF the electronic device, the one or more processors 205 can disable the one or more user interface output devices while leaving the one or more sensors 213 operational. Advantageously, if someone other than the authorized user attempts to power OFF the electronic device 102, the one or more processors 205 can use the one or more sensors 213, the imager 215, the depth imager 216, the thermal sensor 217, the one or more microphones 212, or other components to monitor sights, sounds, and other conditions in a local environment about the electronic device 102.

In one or more embodiments, the one or more processors 205 can further use the wireless communication circuit 207 to transmit a notification of a failure to the detect the authorized user across a network to a remote electronic device. Illustrating by example, if a person had stolen the electronic device 102 and attempted to power it OFF, the one or more processors 205 may use the wireless communication circuit 207 to transmit a text message to another electronic device belonging to the authorized user, e.g., a tablet computer, identifying the fact that an unauthorized user has possession of the electronic device 102 and has attempted to power it OFF. The message may include other information, such as an image of the unauthorized user, a location of the electronic device 102, sounds recorded by the one or more microphones 212, or other data. This alerts the authorized user to the fact that the electronic device 102 may have been stolen, thereby facilitating easier and quicker recovery of the same.

In one or more embodiments, the one or more processors 205 attempt to capture information about the person delivering the command to power OFF the electronic device 102 in response to receipt of the command. For example, in one or more embodiments, the imager 215 may capture an image of the person and/or the depth imager 216 may capture a depth scan of the person in response to receipt of the command to power OFF the electronic device 102. Embodiments of the disclosure contemplate that frequently a person will look at an electronic device while powering it OFF due to the fact that one must watch the delivery of the command to know that it is being delivered correctly. Accordingly, in one or more embodiments an image or facial scan occurs as the person delivering the command to power Off the electronic device 102 looks at the electronic device 102 while delivering the command.

In one or more embodiments, the one or more processors 205 can take further steps to identify the unauthorized user. For example, prior to disabling the one or more user interface devices, in one or more embodiments the one or more processors 205 may present a prompt, via the user interface 203, for biometric input from the person delivering the command to power OFF the electronic device 102. Such a prompt may ask the person delivering the command to authenticate or confirm their identity. For example, the one or more processors may present a prompt on the display requesting that the person place their finger on a fingerprint sensor, enter a code, look at an imager, or so forth. In one or more embodiments, the fingerprint sensor can be integrated as part of a power button.

Once this occurs, the one or more processors 205 can then emulate the powered OFF state by disabling the user interface output devices. However, at the same time, the one or more processors 205 use the active and operational input devices to sense, hear, see, communicate, and even upload, via the wireless communication circuit 207, sensed data to a remote electronic device or the cloud. However, to the user holding the device, the electronic device appears completely OFF.

In still other embodiments, the one or more processors 205 use the input devices and other sensors to continually monitor the person using the electronic device 102. Illustrating by example, every few seconds or so the one or more processors 205 may cause the imager 215 to capture one or more images of the person, may cause the depth imager 216 to capture one or more depth scans of the persons, may cause the one or more microphones 212 to capture voice data of the person, and so forth. So long as the authorized user is using the electronic device 102, the electronic device 102 will operate normally. However, should the authorized user fail to be identified, and a command to power OFF the electronic device 102 be received, the one or more processors 205 can disable the one or more user interface output devices while leaving the one or more sensors operational.

Accordingly, the one or more processors 205 emulate a powered OFF state by disabling user output devices such as visual output devices, audio output devices, haptic output devices, or combinations thereof. The electronic device 102 therefore appears to be shutting down. At the same time the one or more processors keep one or more input devices operational. In one or more embodiments, every time an unauthorized shut down happens or defaults, the owner of the electronic device 102 is alerted via other device or email to conserve power, etc. In one or more embodiments, the authorized user and can override this mode of operation. Following unauthorized shut down device can be charged and charge indicators can appear in one or more embodiments.

Accordingly, these input devices monitor environmental conditions, including sounds, sights, location, and/or other information. The one or more processors 205 monitor this information quietly in the background while the electronic device 102 appears to be powered OFF. The fact that information is being monitored is invisible to the user possessing the electronic device 102 in this state in one or more embodiments. As the user interface output devices are OFF, all indications that anything is operational on the electronic device 102 are turned OFF.

In one or more embodiments, once the emulated powered OFF state it entered, the one or more processors 205 can increase a number of authorized user identification factors required to access preselected data stored within the electronic device. This preselected data can include authorized user identified files, authorized user identified data, private data, or other personal data. This preselected data can also include certain device commands such as the factory-reset command, the erase all data command, the format memory command, and so forth. This increased number of authorized user identification factors is then required to either cease emulating the powered OFF state or to again access this preselected data.

Illustrating by example, imagine that an authorized user has health and financial information stored within the memory 206 of the electronic device 102. Using the user interface 203, the authorized user may designate this data as private data to be hidden should the electronic device 102 be stolen. Upon detecting an unauthorized user attempting to power OFF the electronic device 102, the one or more processors 205 may hide this information from view or access. If a facial scan is all that is typically required to turn the electronic device ON, the one or more processors 205 may require a facial scan, fingerprint, and personal identification number (PIN) code before revealing this information. The same number of increased user authentication factors may be required to cease emulation of a powered OFF state and return to the fully powered ON state. Alternatively, the one or more processors 205 may reveal the predefined data and/or cease the powered OFF state and return to the fully powered ON state if the authorized user delivers a facial scan while at an identified owner location, such as in front of his vehicle license plate or in his living room. Other examples of elevating the number of authorized identification factors will be obvious to those of ordinary skill in the art having the benefit of this disclosure.

In still another embodiment, the one or more processors 205 may hide any device hardware command that would erase data within the electronic device 102 upon failing to detect an authorized user as the source of a received command to power OFF the electronic device 102. Many devices, for example, include a "factory reset" command. As used herein, a "factor reset" command is a software restore command that returns the software of the electronic device 102 to its original system state by erasing all information stored on the electronic device 102 by an authorized user in an effort to return the software to the original manufacturer's settings.

Upon detecting an unauthorized user attempting to power OFF the electronic device 102, the one or more processors 205 may hide this command from view or access. If a facial scan is all that is typically required to turn the electronic device ON, the one or more processors 205 may require a facial scan, fingerprint, and personal identification number (PIN) code before allowing factory resets to again occur. Thus, in one or more embodiments the ability to factory reset the electronic device 102 will be disabled when emulating the powered OFF state. Similarly, private applications of files identified by the user as personal can be hidden when emulating the powered OFF state.

In one or more embodiments, the one or more processors 205 can notify other electronic devices of its location. The one or more processors 205 can further transmit ambient environmental information such as acoustic information, weather information (wind, rain), traffic information, images of people, motion information, and so forth to these other electronic devices using the wireless communication circuit 207. The one or more processors 205 can, for instance, continually or periodically use the imager 215 to capture images of the immediate environment about the electronic device 102. The one or more processors 205 can cause these images to be transmitted from the wireless communication circuit 207 to these remote devices.

In one or more embodiments, this captured information can first be stored internally within the electronic device 102 in a region 223 of memory 206 that can only be erased by the operating system. Where this occurs, even if there is a "factory reset" of the electronic device 102, this data will be protected In still another embodiment, the one or more processors 205 can periodically wake to perform the environmental monitoring with the operational user interface devices. This works to conserve battery capacity. When operational, the one or more processors 205 can gather information, attempt to send identify the authorized user, deliver data representations of the one or more environmental inputs received to a remote electronic device, and so forth, even when initially powered OFF by an authorized user.

In this mode, the one or more processors 205 can detect whether an unauthorized user has somehow taken control of the electronic device while powered OFF. Embodiments of the disclosure contemplate that an authorized user can lose the electronic device 102 when it is in a powered OFF state. This mode of operation advantageously allows the one or more processors 205 to determine if an unauthorized user has taken control of the electronic device 102, and optionally, to notify the authorized user and/or have the authorized user communicate with the electronic device 102 via the cloud.

Figure 5:
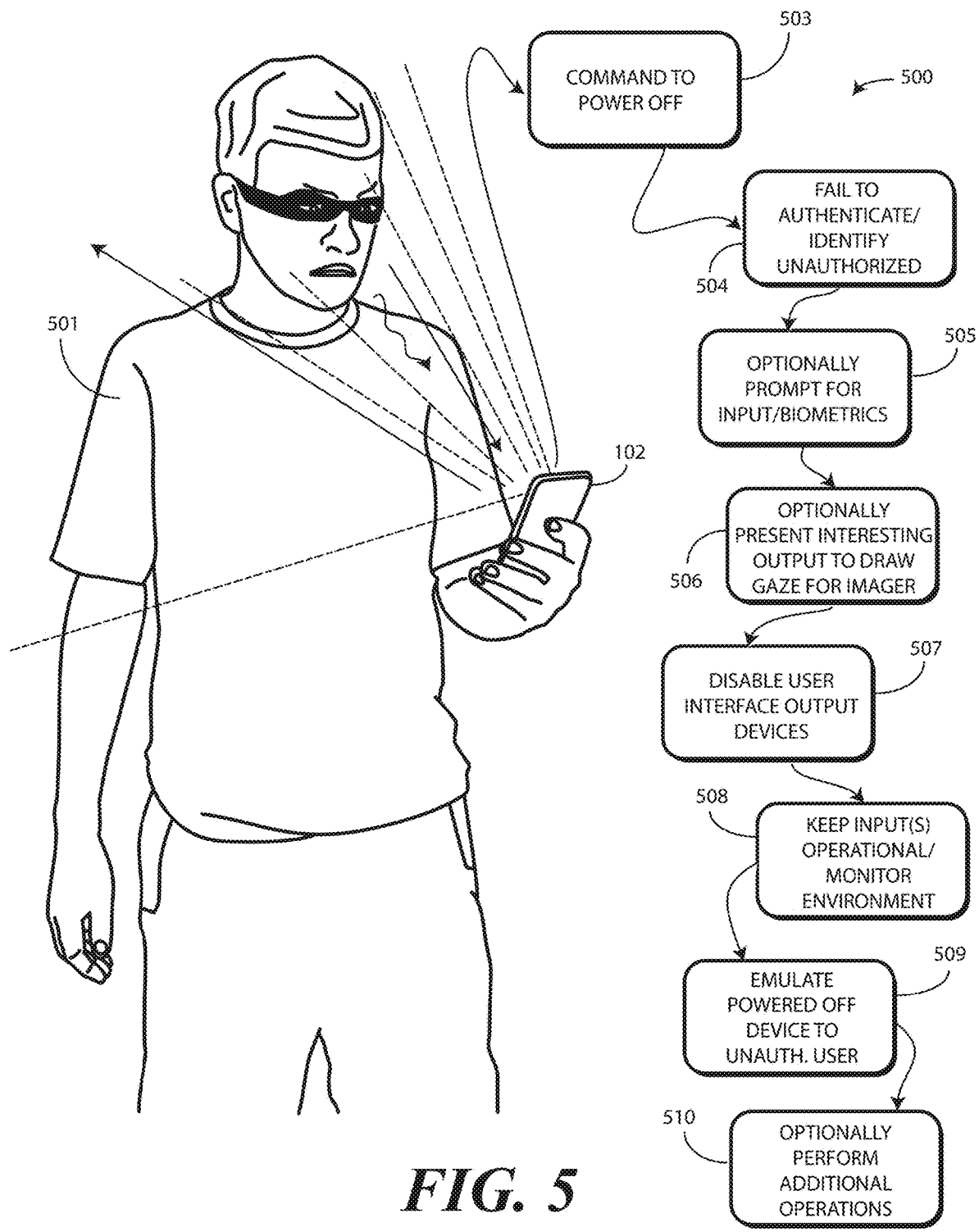
FIG. 5 illustrates a miscreant after having stolen one explanatory electronic device configured in accordance with one or more embodiments of the disclosure, in addition to one or more method steps operable in such situations in accordance with one or more embodiments of the disclosure.

Turning now to FIG. 5, illustrated therein is one explanatory method 500 configured in accordance with one or more embodiments of the disclosure. As shown in FIG. 5, a miscreant 501 has gained possession of the electronic device 102 via theft. The miscreant 501 is, therefore, definitely not an authorized user of the electronic device 102.

As shown in FIG. 5, the miscreant is delivering a command 503 to power OFF the electronic device 102. The one or more processors (205) of the electronic device 102 receive the command 503 to power OFF the electronic device 102 from the user interface (203). In one or more embodiments, when this occurs, the one or more processors (205) of the electronic device 102 attempts to authenticate the miscreant 501 as an authorized user of the electronic device 102. In one or more embodiments, this attempt to identify occurs in response to the receiving the command 503 to power OFF the electronic device 102.

As noted above, this attempt at authentication can occur in a variety of ways, which can include attempting to identify a fingerprint image with a fingerprint sensor, attempting to verify an entered PIN code, attempting to match a voice print using voice recognition, attempting to identify the iris of the authorized user with an iris scan, or by other techniques. In this illustrative embodiment, the miscreant 501 is delivering a facial recognition input to an authenticator. The facial recognition input here includes two-dimensional imaging, depth scan imaging, and thermal sensing.

At step 504, the one or more processors (205) of the electronic device 102 fail to identify the authorized user of the electronic device 102. In the illustrative embodiment of FIG. 5, this is true because the miscreant 501 is not the authorized user. Accordingly, by receiving the facial recognition input, the one or more processors (205) of the electronic device 102 positively confirm that an unauthorized user is providing the command 503 to power OFF the electronic device 102.

However, it should be noted that in other instances this failure to authenticate could occur even without a positive confirmation that an unauthorized user is providing the command 503 to power OFF the electronic device 102. Illustrating by example, where the electronic device 102 employs facial recognition input as the primary authentication mechanism, and the authorized user provides the command 503 to power OFF the electronic device 102, but is not within view of the authentication system (108), there will be a failure to authenticate. Embodiments of the disclosure contemplate that it is desirable to enter the emulated powered OFF state in such situations rather than the fully powered OFF state as a safeguard for situations where the failure to authenticate is due to nefarious purposes. Accordingly, in one or more embodiments, anytime there is a failure to authenticate an authorized user as a source of a command 503 to power OFF the electronic device 102, the one or more processors (205) disable user interface output devices while keeping one or more input devices operational regardless of whether the failure occurred due to a positive confirmation that an unauthorized user is providing the command 503 to power OFF the electronic device 102 or due to another reason.

Where there is a failure to authenticate due to a reason other than a positive confirmation that an unauthorized user is providing the command 503 to power OFF the electronic device 102, and the one or more processors (205) begin to enter the powered OFF emulation mode, it is possible for the authorized user to then be authenticated. For example, where the electronic device 102 employs facial recognition input as the primary authentication mechanism, and the authorized user provides the command 503 to power OFF the electronic device 102, but is not within view of the authentication system (108), but later presents themself within view of the authentication system (108), the authentication system (108) may identify the authorized user prior to entering the emulated powered OFF state. Where this occurs, i.e., where the authorized user of the electronic device 102 is identified, the one or more processors (205) can simply power OFF the electronic device 102 in response to the command 503 to power OFF the electronic device 102.

In this illustrative example, however, this is not the case. The miscreant 501 is holding the electronic device 102 and is delivering the command 503 to power OFF the electronic device 102. Accordingly, upon failing to identify the authorized user of the electronic device 102, at step 507 the one or more processors (205) of the electronic device 102 disable user interface output devices of the electronic device while, at step 508, keeping one or more input devices of the electronic device 102 operational. This allows the one or more processors (205) of the electronic device 102 to monitor, at step 508, with one or more input devices, one or more inputs from an environment of the electronic device 102.

The execution of steps 507,508 result in the electronic device 102 emulating, at step 509, emulating, with the user interface 203 of the electronic device 102, a powered OFF state of the electronic device 102. Step 509 can further include precluding, with the one or more processors (205), enabling the user interface output devices until the authorized user is authenticated. Step 509 can include precluding, with the one or more processors (205), erasure of data stored in a memory (206) of the electronic device 102. Step 509 can include precluding, with the one or more processors (205), a factory reset of the electronic device 102, as previously described. These steps can be performed in combination or individually. Other options suitable for inclusion with step 509 will be obvious to those of ordinary skill in the art having the benefit of this disclosure.

Figure 7:
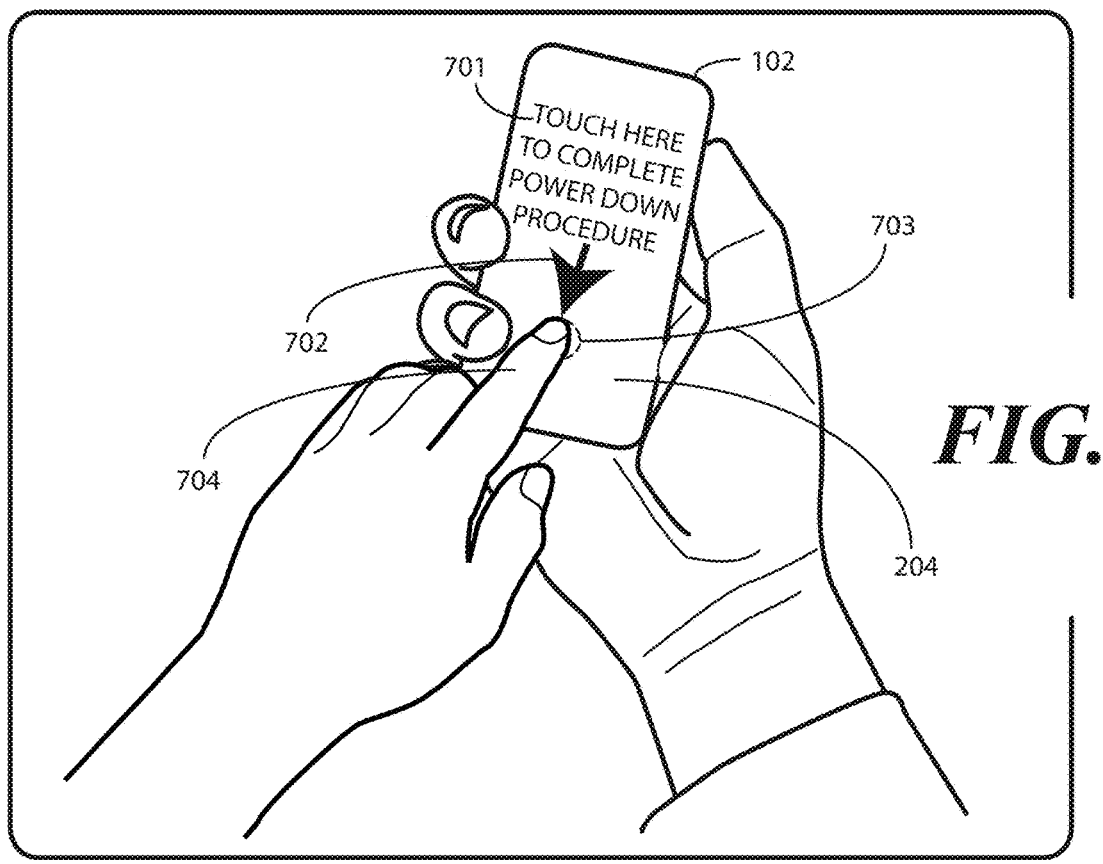
FIG. 7 illustrates one or more method steps in accordance with one or more embodiments of the disclosure.

Prior to these steps 507,508 occurring, optional intermediate steps can be performed as well. For instance, at optional step 505 the one or more processors (205) of the electronic device 102 can prompt, on a display (204) of the electronic device 102, for biometric input before executing steps 507,508,509. Turning briefly to FIG. 7, illustrated therein is an example of how this might occur.

As shown in FIG. 7, the one or more processors (205) of the electronic device 102 have presented prompt 701 for biometric input on the display 204 of the electronic device 102 in response to receipt of the command (503) to power OFF the electronic device 102. In this embodiment, the prompt 701 is for a fingerprint scan to occur prior to the one or more processors disabling the user interface output devices of the electronic device 102 at step (507) of FIG. 5 above. Here, the prompt states, "Touch here to complete power down procedure," with an arrow pointing to a fingerprint sensor 703 located within and beneath the display 204. To complete the perceived power down procedure, the miscreant (501) must touch the fingerprint sensor 703 with his finger 704 or the electronic device 102 will not enter the emulated powered OFF mode. Since the fingerprint sensor 703 has a location within the perimeter of the display 204 in this embodiment, a fingerprint scan can be unknowingly and seamlessly captured by making a perceived "shut down touch area" in the same area surrounding fingerprint sensor 703 in this embodiment.

Figure 8:
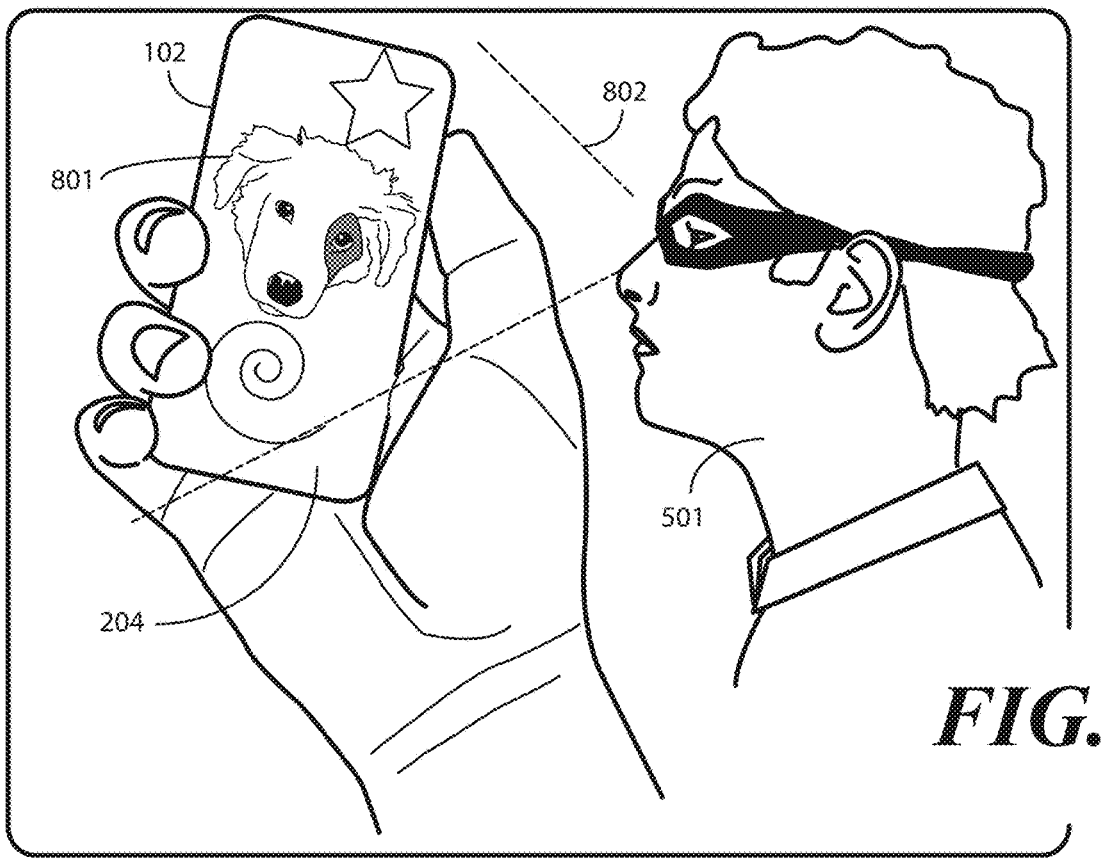
FIG. 8 illustrates one example of how an output from an electronic device can be delivered.

Turning back to FIG. 5, at optional step 506, the one or more processors (205) of the electronic device 102 can optionally deliver an output to the miscreant 501 in an attempt to make the miscreant 501 look at the electronic device 102 so that facial recognition input—or other biometric input—can be captured by the electronic device 102. As noted above, this facial recognition input can include two-dimensional imaging, depth scan imaging, thermal sensing, or combinations thereof. The output can be a presentation of an image or animation on the display (204) of the electronic device 102, delivery of audio signals to an audio output device of the electronic device 102, delivery of haptic or tactile output to a housing of the electronic device 102, or other output that can be perceived by the miscreant 501. In one or more embodiments, delivery of this output can occur until the imager (215) of the electronic device 102 captures a captured image of a source, here the miscreant 501, of the command 503 to power OFF the electronic device 102. Turning briefly to FIG. 8, illustrated therein is one example of how this can occur.

As shown in FIG. 8, the one or more processors (205) of the electronic device 102 have presented an eye-catching image 801 of a dog named Buster on the display 204 of the electronic device 102. This eye-catching image 801 encourages the miscreant 501 to look at the electronic device 102 until the imager (215) of the electronic device 102 captures a captured image 802 of the source of the command (503) to power OFF the electronic device 102. Alternatively, audio output delivered may encourage the miscreant 501 to talk to the electronic device 102, thereby extending any authentication time required by the authentication system (108) to positively confirm that an unauthorized user is providing the command (503) to power OFF the electronic device 102. In yet another embodiment, the user interface can be slowed down, which gives the electronic device 102 more time to capture a captured image 802 of the source of the command (503) to power OFF the electronic device 102.

Figure 6:
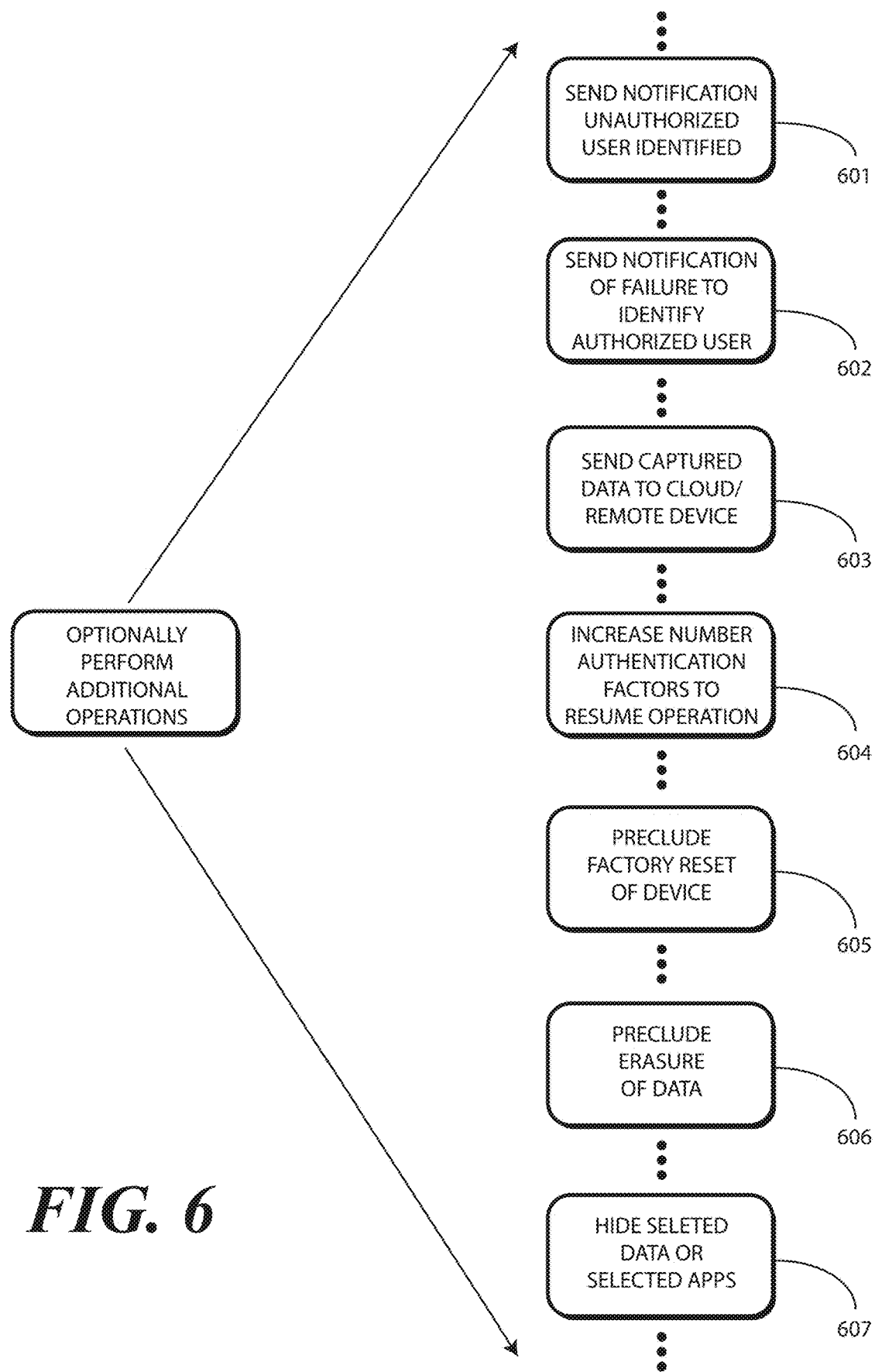
FIG. 6 illustrates one or more optional method steps in accordance with one or more embodiments of the disclosure.

Turning back to FIG. 5, once the electronic device 102 begins emulating the powered OFF mode, at step 510 one or more additional operations can occur. Turning to FIG. 6, illustrated therein are a few of the possible additional operations that can occur. Still others will be obvious to those of ordinary skill in the art having the benefit of this disclosure.

At 601, the additional operations can include sending a notification that an unauthorized user has been positively confirmed as providing a command to power OFF the electronic device. At 602, the additional operations can include sending a notification there has been a failure to identify an authorized user as the source of a command to power OFF the electronic device.

When an electronic device is stolen, and the thief attempts to power it OFF, one or more processors of the electronic device may use the wireless communication circuit to transmit a wireless communication to another electronic device belonging to the authorized user. This wireless communication can identify the fact that an unauthorized user has possession of the electronic device and has attempted to power it OFF. The message may include other information, such as an image of the unauthorized user, a location of the electronic device, sounds recorded by the one or more microphones 212, or other data. This alerts the authorized user to the fact that the electronic device may have been stolen, thereby facilitating easier and quicker recovery of the same.

At the same time, if the failure to identify the authorized user was due to reasons other than an unauthorized user having access to the electronic device, such a notification can be beneficial as well. If it was due to the fact that there was an unavoidable failure to capture the necessary information about the authorized user, in one or more embodiments the authorized user could disable the emulated powered-OFF mode remotely to turn the electronic device fully OFF.

At 603, the additional operations can include transmitting, across a network with a wireless communication circuit, data representations of the one or more inputs to a remote electronic device. Recall from above that step (509) of FIG. 5 can include monitoring, with one or more input devices, one or more inputs from an environment of the electronic device. Data representations, such as images, video files, audio files, location information, weather information, motion, and so forth, can then be transmitted to a remote electronic device such as an electronic device belonging to the authorized user or a cloud-computing device.

At 604, the additional operations can include increasing a number of authorized user identification factors required to cease emulating the powered OFF state. Illustrating by example, if a facial scan is all that is typically required to turn the electronic device ON, the one or more processors may require a facial scan, fingerprint, and personal identification number (PIN) code before ceasing emulation of the powered OFF state and return to the fully powered ON state. Alternatively, the one or more processors may cease the powered OFF state and return to the fully powered ON state if the authorized user delivers a facial scan while at an identified owner location, such as in front of his vehicle license plate or in his living room. Other examples of elevating the number of authorized identification factors will be obvious to those of ordinary skill in the art having the benefit of this disclosure.

At 605, the additional operations can include preclusion of the ability to perform a factory reset of the electronic device as previously described. At 606, the additional operations can include preclusion of the ability to erase data. For example, if an unauthorized user delivers a command to power OFF the electronic device, the erase function selection can be removed in one embodiment. In an alternate embodiment, is the erase function is one or more of removed, made invisible, or made to disappear, and thus no longer a selectable item unless identity is confirmed to be authorized.

At 607, if an unauthorized user delivers a command to power OFF the electronic device, certain applications become invisible. These include applications such as a gallery application, a phone application, an email application, a device usage history application, and so forth. Such applications can be selected in advance using a menu during device setup.

As noted above, FIG. 6 illustrates only some of the possible additional operations that can occur. Still others will be obvious to those of ordinary skill in the art having the benefit of this disclosure. Illustrating by example, in one or more embodiments if the battery of the electronic device becomes depleted, the electronic device will default to the powered OFF emulation mode when coupled to a charger. Additionally, in one or more embodiments to further conserve power, transmission of representations of captured data to remote electronic devices or the cloud will be restricted to times when the electronic device is coupled to a charger. Embodiments of the disclosure contemplate that a thief or other miscreant may attempt to charge the electronic device at some point.

Figure 9:
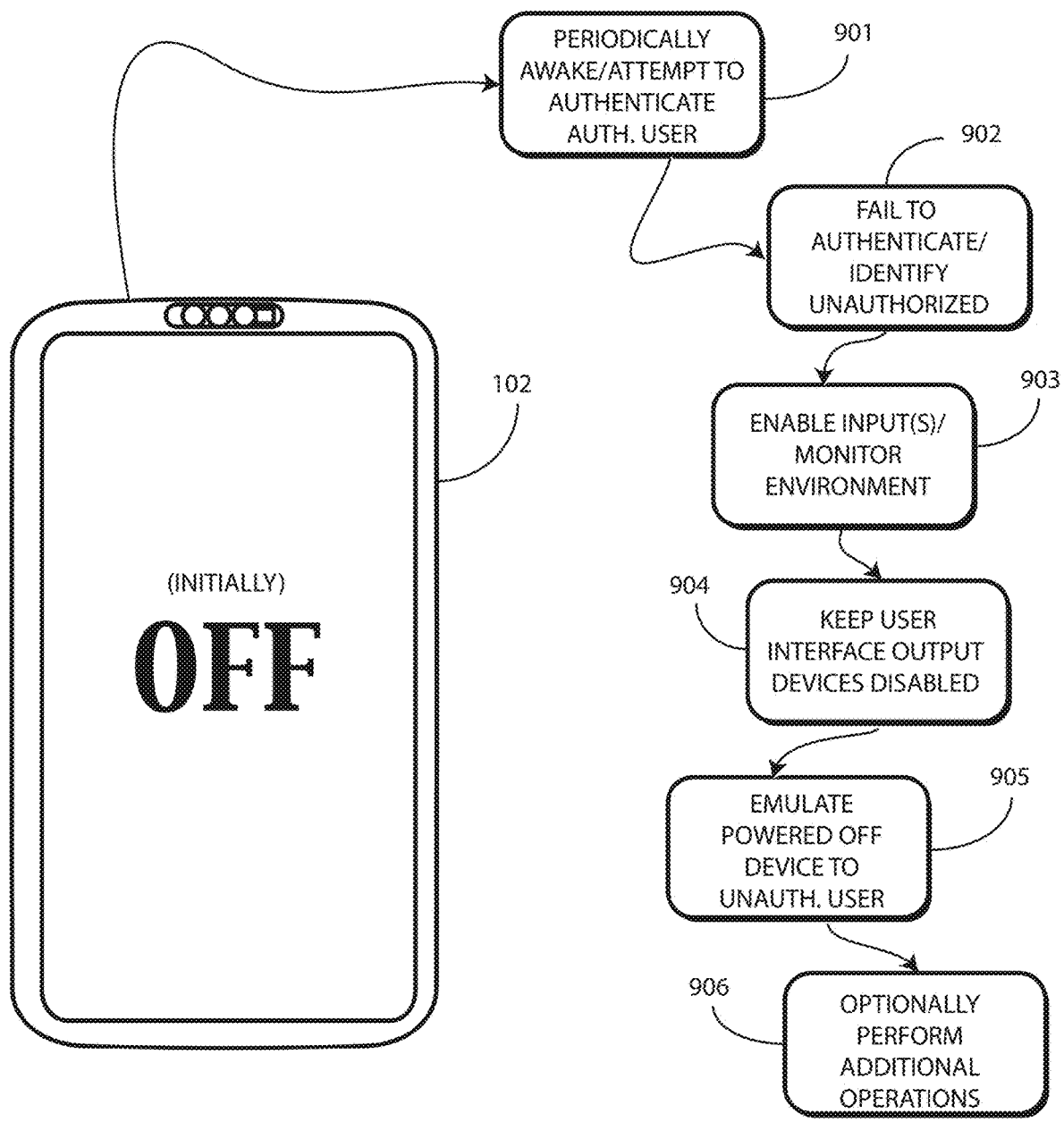
FIG. 9 illustrates one or more methods steps in accordance with one or more embodiments of the disclosure.

Turning now to FIG. 9, as noted above, embodiments of the disclosure contemplate that the electronic device 102 can be lost or stolen while powered OFF. In FIG. 9, the command to power OFF the electronic device 102 was received from an authorized user, as the authorized user was identified. Accordingly, the electronic device 102 was fully powered OFF in response to the command to power OFF the electronic device 102.

However, at step 901, the one or more processors (205) periodically wake to perform environmental monitoring by making operational one or more user input devices. One of the monitoring operations includes attempting to identify an authorized user of the electronic device 102.

At step 902, the one or more processors (205) of the electronic device 102 fail to identify the authorized user of the electronic device 102. This may occur because a malfeasant has possession of the electronic device 102. Alternatively, this failure to authenticate can occur even without a positive confirmation that an unauthorized user is providing the command to power OFF the electronic device 102, as noted above.

Where this occurs, step 903 can comprise enabling one or more input devices and monitoring an environment of the electronic device 102. Step 904 can comprise maintaining the disabled state of the user interface output devices, as was the case in the powered OFF state, thereby emulating the powered OFF state at step 905.

Step 903 can also include gathering information, attempting to identify persons within the environment of the electronic device, delivering data representations of the one or more environmental inputs received to a remote electronic device, and so forth. In the illustrative embodiment of FIG. 9, this occurs even when the authorized user initially powered OFF electronic device 102.

In this mode, the one or more processors can detect whether an unauthorized user has somehow taken control of the electronic device 102 while powered OFF. Moreover, this operational state could continue so long as there was sufficient battery capacity. This mode of operation advantageously allows the one or more processors to determine if an unauthorized user has taken control of the electronic device 102. Optionally, at step 906, the electronic device 102 can perform other operation such as notifying the authorized user and/or have the authorized user communicate with the electronic device 102 via the cloud.

Figure 10:
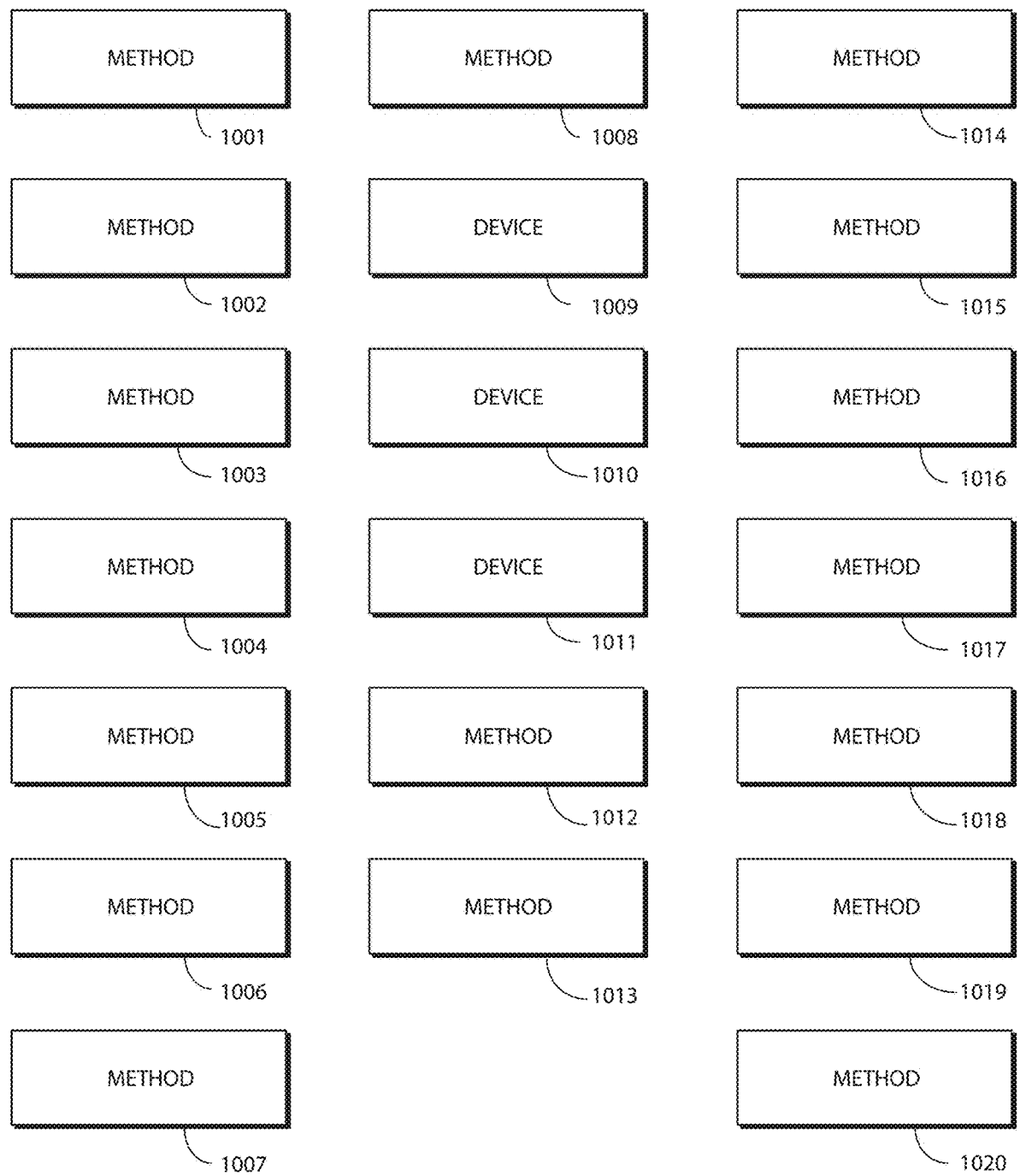
FIG. 10 illustrates one or more embodiments of the disclosure.

Turning now to FIG. 10, illustrated therein are various embodiments of the disclosure. At 1001, a method in an electronic device comprises identifying, with one or more sensors of the electronic device, an unauthorized user providing a command, received at a user interface of the electronic device, to power OFF the electronic device. At 1001, the method comprises disabling, with one or more processors of the electronic device, user interface output devices of the electronic device while keeping one or more input devices of the electronic device operational.

At 1002, the disabling of 1001 comprises disabling all user interface output devices of the electronic device. At 1003, the method of 1001 further comprises emulating, with the user interface, a powered OFF state of the electronic device.

At 1004, the user interface output devices of 1003 comprise one or more of visual output devices, audio output devices, haptic output devices, or combinations thereof. At 1004, the input devices of 1003 comprise one or more of an imager, a microphone, a geo-locator, a wireless communication circuit, a motion detector, or combinations thereof.

At 1005, the method of 1003 further comprises monitoring, with the one or more input devices, one or more inputs from an environment of the electronic device. AT 1006, the method of 1005 further comprises transmitting, across a network with a wireless communication circuit, data representations of the one or more inputs to a remote electronic device. At 1007, the method of 1003 further comprises transmitting, across a network with a wireless communication circuit, a notification that the unauthorized user has been identified to a remote electronic device. At 1008, the method of 1003 further comprises increasing a number of authorized user identification factors required to cease emulating the powered OFF state.

At 1009, an electronic device comprises one or more sensors. At 1009, the electronic device comprises a user interface comprising one or more user interface output devices. At 1009, the electronic device comprises one or more processors operable with the one or more sensors and the user interface. At 1009, the one or more processors receive, from the user interface, a command to power OFF the electronic device. At 1009, the one or more processors, upon failing to detect, with the one or more sensors, an authorized user of the electronic device as a source of the command to power OFF the electronic device, disable the one or more user interface output devices while leaving the one or more sensors operational.

At 1010, the electronic device of 1009 further comprises a wireless communication circuit. At 1010, the one or more processors further transmit, with the wireless communication circuit, a notification of a failure to detect the authorized user across a network to a remote electronic device.

At 1011, the one or more processors of 1009 further prompt, with the user interface, for biometric input prior to disabling the one or more user interface devices. At 1012, the one or more processors further increase a number of authorized user identification factors required to access preselected data stored within the electronic device.

At 1013, a method in an electronic device comprises receiving, from a user interface of the electronic device, a command to power OFF the electronic device. At 1013, the method in the electronic device comprises attempting to identify, with one or more sensors of the electronic device, an authorized user of the electronic device. At 1013, the method in the electronic device comprises, upon failing to identify the authorized user of the electronic device, disabling, with one or more processors of the electronic device, user interface output devices of the electronic device while keeping one or more input devices of the electronic device operational. At 1013, the method in the electronic device comprises monitoring, with the one or more input devices, one or more inputs from an environment of the electronic device.

At 1014, the attempting to identify at 1013 occurs in response to the receiving the command to power OFF the electronic device. At 1015, the method of 1013 further comprises identifying the authorized user of the electronic device and powering OFF the electronic device in response to the command to power OFF the electronic device.

At 1016, the method of 1013 further comprises precluding, with the one or more processors, enabling the user interface output devices until the authorized user is authenticated. At 1017, the method of 1013 further comprises precluding, with the one or more processors, erasure of data stored in a memory of the electronic device. At 1018, the method of 1013 further comprises precluding, with the one or more processors, a factory reset of the electronic device. At 1019, the method of 1013 further comprises presenting, with the one or more processors, one of an image or animation on a display, or delivering, with the one or more processors, audio signals to an audio output device, until an imager captures a captured image of a source of the command to power OFF the electronic device. At 1020, the method of 1013 further comprises prompting, on a display of the electronic device, for a fingerprint scan prior to disabling the user interface output devices of the electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    identifying, with one or more sensors of the electronic device, an unauthorized user providing a command, received at a user interface of the electronic device, to power OFF the electronic device;
    disabling, with one or more processors of the electronic device, user interface output devices of the electronic device while keeping one or more input devices of the electronic device operational;
    emulating, with the user interface, a powered OFF state of the electronic device; and
    increasing a number of authorized user identification factors required to cease emulating the powered OFF state.

2. The method of claim 1, wherein the disabling comprises disabling all user interface output devices of the electronic device.

3. The method of claim 1, further comprising hiding one or more applications, one or more files, or combinations thereof when emulating the powered OFF state.

4. The method of claim 1, wherein the user interface output devices comprise one or more of visual output devices, audio output devices, haptic output devices, or combinations thereof, further wherein the one or more input devices comprise one or more of an imager, a microphone, a geo-locator, a wireless communication circuit, a motion detector, or combinations thereof.

5. The method of claim 1, further comprising monitoring, with the one or more input devices, one or more inputs from an environment of the electronic device.

6. The method of claim 5, further comprising transmitting, across a network with a wireless communication circuit, data representations of the one or more inputs to a remote electronic device.

7. The method of claim 1, further comprising transmitting, across a network with a wireless communication circuit, a notification that the unauthorized user has been identified to a remote electronic device.

8. The method of claim 1, further comprising further comprising transmitting, across a network with a wireless communication circuit, a location of the electronic device.

9. An electronic device, comprising:
    one or more sensors;
    a user interface comprising one or more user interface output devices; and
    one or more processors operable with the one or more sensors and the user interface;
    the one or more processors receiving, from the user interface, a command to power OFF the electronic device, and upon failing to detect, with the one or more sensors, an authorized user of the electronic device as a source of the command to power OFF the electronic device, disabling the one or more user interface output devices while leaving the one or more sensors operational and increasing a number of authorized user identification factors required to access preselected data stored within the electronic device.

10. The electronic device of claim 9, further comprising a wireless communication circuit, the one or more processors further transmitting, with the wireless communication circuit, a notification of a failure to detect the authorized user across a network to a remote electronic device.

11. The electronic device of claim 9, the one or more processors further prompting, with the user interface, for biometric input prior to disabling the one or more user interface output devices.

12. The electronic device of claim 9, the one or more processors further increasing the number of authorized user identification factors required to access preselected data stored within the electronic device to at least two authorized user identification factors.

13. A method in an electronic device, the method comprising:
   receiving, from a user interface of the electronic device, a command to power OFF the electronic device;
   attempting to identify, with one or more sensors of the electronic device, an authorized user of the electronic device;
   prompting, on a display of the electronic device, for a fingerprint scan;
   upon failing to identify the authorized user of the electronic device, disabling, with one or more processors of the electronic device after the prompting, user interface output devices of the electronic device while keeping one or more input devices of the electronic device operational; and
   monitoring, with the one or more input devices, one or more inputs from an environment of the electronic device.

14. The method of claim 13, wherein the attempting to identify occurs in response to the receiving the command to power OFF the electronic device.

15. The method of claim 13, further comprising identifying the authorized user of the electronic device and powering OFF the electronic device in response to the command to power OFF the electronic device.

16. The method of claim 13, further comprising precluding, with the one or more processors, enabling the user interface output devices until the authorized user is authenticated.

17. The method of claim 13, further comprising precluding, with the one or more processors, erasure of data stored in a memory of the electronic device.

18. The method of claim 13, further comprising precluding, with the one or more processors, a factory reset of the electronic device.

19. The method of claim 13, further comprising presenting, with the one or more processors, one of an image or animation on a display, or delivering, with the one or more processors, audio signals to an audio output device, until an imager captures a captured image of a source of the command to power OFF the electronic device.

20. The method of claim 13, the prompting occurring in response to the receiving the command to power OFF the electronic device.

\* \* \* \* \*